US012629912B2

(12) United States Patent
Beamish et al.

(10) Patent No.: US 12,629,912 B2
(45) Date of Patent: May 19, 2026

(54) APPARATUS AND METHOD FOR BURNISHING A REPLICA TAPE

(71) Applicant: DeFelsko Corporation, Ogdensburg, NY (US)

(72) Inventors: Michael Beamish, Ogdensburg, NY (US); Alexander Eugene Roux, III, Ogdensburg, NY (US)

(73) Assignee: DEFELSKO CORPORATION, Ogdensburg, NY (US)

( * ) Notice: Subject to any disclaimer, the term of this patent is extended or adjusted under 35 U.S.C. 154(b) by 0 days.

(21) Appl. No.: 18/934,641

(22) Filed: Nov. 1, 2024

(65) Prior Publication Data

US 2025/0187292 A1 Jun. 12, 2025

Related U.S. Application Data

(60) Provisional application No. 63/596,489, filed on Nov. 6, 2023.

(51) Int. Cl.
*B31F 1/07* (2006.01)
*B24B 39/06* (2006.01)

(52) U.S. Cl.
CPC ................ *B31F 1/07* (2013.01); *B24B 39/06* (2013.01); *B24B 39/065* (2013.01); *B31F 2201/0705* (2013.01); *Y10T 29/47* (2015.01); *Y10T 29/471* (2015.01)

(58) Field of Classification Search
CPC .... B31F 1/07; B31F 2201/0705; Y10T 29/47; Y10T 29/471; B24B 39/06; B24B 39/065
See application file for complete search history.

(56) References Cited

U.S. PATENT DOCUMENTS

| | | | | |
|---|---|---|---|---|
| 845,730 A * | 2/1907 | Marshall | .................. | B43K 8/00 29/90.01 |
| 1,028,029 A * | 5/1912 | Killebrew | ................ | B43K 8/00 81/9.2 |
| 1,171,146 A * | 2/1916 | Scribner | .................. | B43K 8/00 29/90.01 |

(Continued)

FOREIGN PATENT DOCUMENTS

| | | | |
|---|---|---|---|
| JP | H1110432 A * | 1/1999 | .............. B23P 23/02 |
| TN | 2014000023 A1 * | 7/2015 | |

OTHER PUBLICATIONS

Legacy Burnishing Tool, Date DeFelsko, more than one year before the filing of the provisional application (1 page).

*Primary Examiner* — Jermie E Cozart
(74) *Attorney, Agent, or Firm* — BUCHANAN INGERSOLL & ROONEY PC

(57) ABSTRACT

A tool for applying consistent pressure on a flat surface includes a housing, the housing including an exterior portion and an interior hollow portion; a contact member contained within the interior hollow portion; a spring arranged in the interior hollow portion and configured so as to apply a biasing force on the spherical contact member so that a portion of the spherical contact member protrudes from the interior hollow portion; the exterior portion comprising a flat portion having an opening therein, such that the spherical contact member protrudes from the interior hollow portion through the opening; the opening including a first area; the flat portion comprising a second area; wherein a ratio of the second area over the first area is at least two.

18 Claims, 6 Drawing Sheets

(56) References Cited

U.S. PATENT DOCUMENTS

| | | | | | |
|---|---|---|---|---|---|
| 1,915,426 | A * | 6/1933 | Kohler | G01D 15/02 | 81/9.2 |
| 2,247,887 | A * | 7/1941 | Nascimbeni | B24B 39/00 | 407/120 |
| 3,411,364 | A * | 11/1968 | Horley | A61F 9/0061 | 73/818 |
| 3,760,660 | A * | 9/1973 | Van Arnam | B44C 1/1733 | 81/9.2 |
| 5,826,453 | A * | 10/1998 | Prevey, III | B24B 39/00 | 29/90.01 |
| 6,446,549 | B1 | 9/2002 | Soucie et al. | | |
| 8,601,659 | B2 * | 12/2013 | Prevey | B24B 39/003 | 29/90.3 |
| 2014/0007394 | A1 * | 1/2014 | Haas | C21D 7/04 | 29/90.01 |

* cited by examiner

SECTION A-A

APPARATUS AND METHOD FOR BURNISHING A REPLICA TAPE

CROSS-REFERENCE TO RELATED APPLICATIONS

The present application claims the benefit of U.S. Provisional Application No. 63/596,489, filed on Nov. 6, 2023. The entire contents of U.S. Provisional Application No. 63/596,489 is incorporated herein by reference.

FIELD

The present disclosure relates to a method and apparatus for burnishing or compressing a replica tape to represent an original surface of a material. More particularly, the present disclosure relates to a method and apparatus for burnishing such a replica tape by using a consistent pressure.

BACKGROUND

In the field of Non-Destructive Testing surface analysis, known techniques include visual inspection, liquid penetrant, and magnetic particle inspection. In addition, microscopy techniques, such as confocal, interferometric, and scanning electron microscopy (SEM), and mechanical surface profile instruments, such as one- and two-dimensioned stylus-based instruments, are known techniques to determine a surface profile. Within the class of visual inspection techniques, surface replication may be used to aid in the remote inspection of materials. Known surface replication techniques involve the transfer of a surface profile to a media such as a replica tape for indirect examination using microscopy. Known replica tape uses a cellulose acetate film to transfer surface profiling for imaging microstructures with standard microscopy techniques. However, this technique is not used for surface profiling but rather typically as a means to ascertain image crack formation or creep damage of components.

Other known methods of surface transfer to a replicating media include replication putty, shape memory polymer, as well as casting techniques using two-part silicon rubbers and methacrylate. The resulting replica is analyzed using a number of techniques including interferometric, scanning electron microscopy (SEM), and confocal microscopy. One- or two-dimensional mechanical surface profile instruments can also be used on the replica media, such as a drag stylus or needle-type surface profile gages.

It is known to use replica tape to characterize a surface. Method C of ASTM D4417 describes the process for measuring the peak-to-valley distance of a surface, such as abrasive blasted surfaces on metal bridges and ships, for example. The character of the blasted surface is predictive of paint adherence. If the peak-to-valley distance is too small, the surface lacks sufficient “tooth” to anchor the paint. If the peak-to-valley distance is too large, the high peaks may protrude through the paint to become foci for corrosion.

PRESS-O-FILM®, which is an example of a commercially available replica tape, includes a non-compressible 50 μm (2 mil) polyester backing and a compressible layer of foam. The backing is attached to an adhesive backed paper carrier. The carrier has an approximately 8 mm diameter opening exposing the polyester and foam below. The adhesive backed paper carrier is adhered to the surface being characterized. A burnishing tool is used to “burnish” or compress the replica tape by applying force through the polyester backing to the compressible layer of foam, such that the peaks of the surface profile fully compress the foam, while the valleys of the surface profile partially compress the foam. As the peaks of the surface profile fully compress the foam, they become visible through the polyester backing. Once the peaks are visible consistently across the opening in the adhesive backed paper carrier, the burnishing process is complete.

The conventionally used burnishing tool consists of an acrylic rod with a ~¼" diameter spherical tip. The ~¼" diameter spherical tip is sized such that, ideally, the pressure applied by a human hand to the acrylic rod imparts sufficient force between the spherical tip and the polyester backing to fully compress the compressible layer of foam, but not so much force that the polyester backing is damaged.

An alternative burnishing tool is specified by the manufacturer, consisting of the ~¼" diameter spherical corner of the plastic container used to ship the replica tape prior to use.

After burnishing, the thickness of the replica tape is then measured with a spring-loaded micrometer, and the thickness of the polyester backing is subtracted to indicate the peak-to-valley distance of the original surface. Replica tape provides a permanent record of the surface. Some micrometers can also store the thickness reading of the replica tape to provide a permanent record of the peak-to-valley measurement.

Internal research and practical experience indicate that compressed foam thickness, and therefore the resulting measurement of peak-to-valley distance of the original surface, can be influenced by the pressure applied by the operator on the burnishing tool. It is theorized that there are two primary mechanisms that can lead to error.

The first potential source of error occurs when insufficient burnishing force is used. A characteristic of the compressible layer of foam is that it becomes transparent as it compresses. The operator is instructed to stop the burnishing process when the peaks of the surface profile become visible through the polyester backing, indicating that the foam is fully compressed at the peaks of the surface profile. However, it can be difficult for operators to discern between a replica that is fully compressed and a replica that is mostly, but not completely, compressed. This phenomenon typically manifests when measuring surface profiles with a small peak-to-valley distance that requires a greater degree of compression of the foam. If the foam is not fully compressed, the height of the replica foam as measured by the micrometer will be greater than the actual surface profile, generating error.

The second potential source of error occurs when excessive burnishing force is used. To accurately replicate the surface, the peaks of the surface profile should rest against the polyester backing after burnishing. However, if excessive burnishing force is used, the peaks of the surface profile can penetrate the polyester backing. This phenomenon typically manifests when measuring surface profiles with a large peak-to-valley distances and fewer peaks. When this occurs, the foam no longer replicates the entire peak-to-valley profile; instead, only the part of the profile that does not penetrate the polyester backing is measured. This can yield measurement results that are erroneously low.

Both of these sources of error can be mitigated by using a specific and consistent amount of force to burnish the replica tape. A ‘training tool’ is available with a known peak-to-valley distance, which operators can use to practice their burnishing technique to until they reliably achieve replica tape measurements that match the known peak-to-valley height of the standard. With experience, some operators are capable of minimizing this error.

However, the need for extensive experience and practice to obtain accurate results limits the potential users of the technique. Even more experienced users can find it challenging to consistently use the correct amount of force, increasing the errors associated with the test.

Exemplary embodiments of the present disclosure provide an apparatus and method to burnish replica tape by using a burnishing tool that imparts a consistent pressure on the foam under normal usage.

BRIEF SUMMARY OF THE INVENTION

An exemplary embodiment of the present disclosure provides an apparatus for applying consistent pressure on a flat surface. The apparatus comprises a housing, which comprises an exterior portion and an interior hollow portion, a contact member contained within the interior hollow portion, and a spring arranged in the interior hollow portion and configured so as to apply a biasing force on the contact member so that a portion of the contact member protrudes from the interior hollow portion. The exterior portion comprises a flat portion having an opening therein, such that the contact member protrudes from the interior hollow portion through the opening. The opening comprises a first area and the flat portion comprises a second area, wherein a ratio of the second area over the first area is at least one or two.

According to an exemplary embodiment of the apparatus, the contact member is spherical.

According to an exemplary embodiment of the apparatus, a lip is formed at the portion of the flat portion adjacent the interior hollow portion so as to retain the spherical contact member within the interior hollow portion.

According to an exemplary embodiment of the apparatus, a member is provided between the spring and the spherical contact member to transmit force from the spring to the contact member.

According to an exemplary embodiment of the apparatus, the spring is configured to apply a force of about 450 grams on the contact member.

According to an exemplary embodiment of the apparatus, wherein the ratio of the second area over the first area is at least four.

An exemplary embodiment of the present disclosure provides a method of burnishing a replica tape with consistent pressure with an apparatus having a flat surface with an opening in it, and a spring-loaded contact member protrudes from the opening. The method comprises applying the flat portion of the apparatus on the replica tape and moving the apparatus over the replica tape so that the spring-loaded contact member applies a substantially consistent pressure on the replica tape.

Another exemplary embodiment of the present disclosure provides an apparatus for applying consistent pressure on a flat surface. The apparatus comprises a first elongated portion having a first end and a second, rounded end; a holder; and a flexible cylinder. A first end of the flexible cylinder is attached to the holder and the first end of the first elongated portion is connected to a second end of the flexible cylinder.

According to an exemplary embodiment of the apparatus, the flexible cylinder is a coiled spring.

According to an exemplary embodiment of the method, the method comprises applying the rounded end of the apparatus on the replica tape and applying pressure on the replica tape with the rounded end while holding the holder.

An exemplary embodiment of the present disclosure provides a tool for applying consistent pressure on a flat surface. The tool comprises a long arm having a torsion spring mounted at one end thereof, a short arm having a first end that is rounded and capable of burnishing a replica tape, and a second end of the short arm that includes a protrusion that is configured to engage with the torsion spring such that the short arm can pivot with respect to the long arm.

BRIEF DESCRIPTION OF THE DRAWINGS

Additional refinements, advantages and features of the present disclosure are described in more detail below with reference to exemplary embodiments illustrated in the drawings, in which.

In the drawings, identical or similarly functioning parts are denoted with the same reference symbols, unless otherwise noted. It is to be noted that components illustrated in the drawings are not always shown to scale.

DETAILED DESCRIPTION OF THE PREFERRED EMBODIMENTS

Exemplary embodiments of the present disclosure solve the drawbacks noted above by providing an apparatus which applies consistent pressure when used to burnish a replica tape, as well as a method for burnishing a replica tape with consistent pressure. Exemplary embodiments of the present disclosure provide an apparatus and method which can be used to burnish a replica tape with consistent pressure by using force-limiting means to regulate the pressure applied to the replica tape, mitigating the sources of error that occur when insufficient or excessive burnishing force is applied to a burnishing tool by an operator.

In the following description of exemplary embodiments of the present disclosure, an apparatus and method for burnishing a replica tape with consistent pressure are described. Hereinafter, the term "replica tape" means a medium or film that may be embossed, compressed or cast on a surface of a material in order to replicate that surface. Any medium or film that has a characteristic intensity versus thickness function can be utilized with the features of the present disclosure as described herein and is intended to be encompassed within the definition of a "replica tape" as used herein. For example, a cast methacrylate replica embedded with a pigment can be used. A commonly known example of replica tape includes a polyester backing and a compressible foam surface. This is an example of a replica tape which may be utilized in the present disclosure, and the present disclosure is not limited thereto. For example, a replica tape may be composed of a backing that is made of a material other than polyester (e.g., nylon), and the compressible surface may be constituted by a material other than foam, where such material may be rigid. Alternatively, the replica tape may have only a compressible surface without any backing. For the sake of brevity, the term "replica tape" hereinafter refers to a replica tape which may be embossed, compressed or cast on a surface of a material to replicate that surface, unless otherwise noted.

Figure 1:
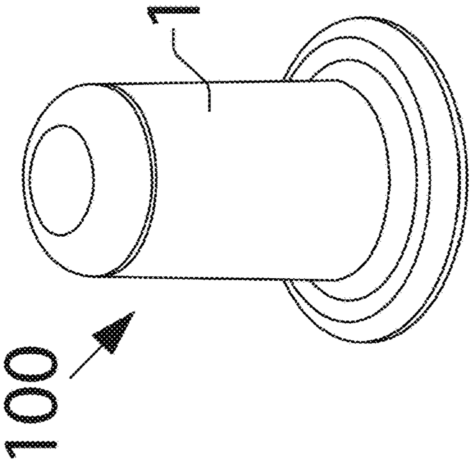
FIG. 1 is a perspective view of an apparatus for applying consistent pressure on a flat surface according to an exemplary embodiment of the present disclosure.

FIG. 1 is a perspective view of an apparatus 100 for applying consistent pressure on a flat surface according to an exemplary embodiment of the present disclosure. In accordance with an exemplary embodiment, the apparatus 100 comprises a housing 1. In the example of FIG. 1, a perspective view of the housing 1 is shown.

Figure 2:
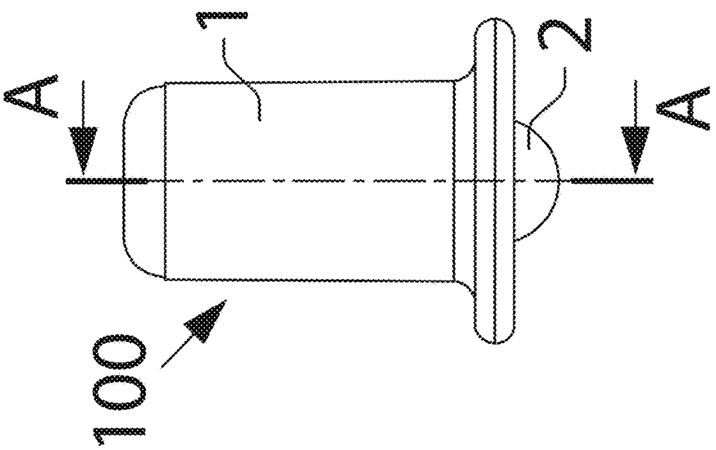
FIG. 2 is a front view of the apparatus of FIG. 1 for applying consistent pressure on a flat surface according to an exemplary embodiment of the present disclosure.

FIG. 2 is a front view of an apparatus 100 for applying consistent pressure on a flat surface according to an exemplary embodiment of the present disclosure. In accordance with an exemplary embodiment, the apparatus 100 comprises a housing 1 and a contact member 2. In FIG. 2, the contact member 2 is partially contained in and protrudes from the housing 1. A cross-section A-A is shown to pass through the center of the apparatus 100.

Figure 3:
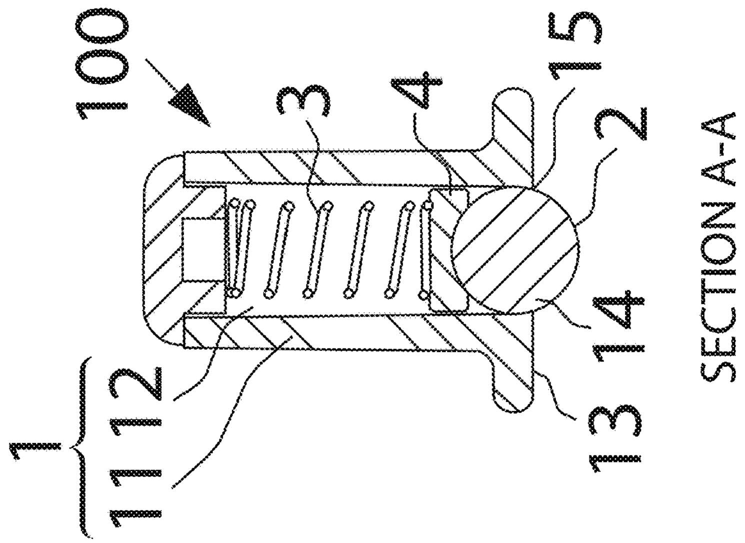
FIG. 3 is a cross-sectional view of the apparatus of FIG. 1 for applying consistent pressure on a flat surface according to an exemplary embodiment of the present disclosure.

FIG. 3 is a cross-sectional view of an apparatus 100 for applying consistent pressure on a flat surface according to an exemplary embodiment of the present disclosure. The cross-sectional view shown is the cross-section A-A of FIG. 2. In accordance with an exemplary embodiment, the apparatus 100 comprises a housing 1, comprising an exterior portion 11 and an interior hollow portion 12. In FIG. 3, the exterior portion 11 forms the outside of the housing 1 and the interior hollow portion 12 forms a hollow opening in the housing 1 within which further components of the apparatus 100 are disposed.

In accordance with the exemplary embodiment, a contact member 2 is contained within the interior hollow portion 12. In FIG. 3, the contact member 2 is a sphere partially contained within the interior hollow portion 12. The contact member 2 is not limited to a sphere and may be a hemisphere or any other shape wherein the part of the contact member contacting the surface has a spherical or rounded shape. In a preferred embodiment, the diameter of the contact member 2 is between about 0.125-about 1 in., more preferably between 0.2-0.9 in., between 0.3-0.8 in., between 0.3-0.7 in., between 0.3-0.6 in., between 0.3-0.5 in., between 0.3-0.4 in., or about 0.25 in.

In accordance with the exemplary embodiment, a spring 3 is arranged in the interior hollow portion 12 and is configured so as to apply a biasing force on the contact member 2 so that a portion of the contact member 2 protrudes from the interior hollow portion 12. In the example of FIG. 3, the spring 3 extends within a portion of the length of the interior hollow portion 12. The length of the interior hollow portion 12 varies based on the length of the spring 3 when not in use. The length and stiffness of the spring 3 when not in use varies based on the preferred force which it is configured to apply to the contact member 2.

In accordance with an exemplary embodiment, the spring 3 is configured to apply a force of about 450 grams on the contact member 2. The force which the spring 3 is configured to apply is related to and varies with the diameter of the contact member 2 and the nature of the replica tape. For a contact member 2 with a preferred diameter of about 0.3 in., the spring 3 may be configured to apply a force preferably between 400-500 grams, 425-475 grams, or about 450 grams. The spring 3 may be configured to apply the appropriate force which corresponds to any of the preferable diameters of the contact member 2.

In accordance with the exemplary embodiment, a member 4 is provided between the spring 3 and the contact member 2 to transmit force from the spring 3 to the contact member 2. In FIG. 3, the member 4 is arranged in the interior hollow portion 12 between the spring 3 and the contact member 2. The force from the spring 3 may be transmitted to the contact member 2 by the member 4, which has a larger surface area than the spring 3 at a surface adjacent to the contact member 2 and contacts a larger surface area of the contact member 2, for a more uniform and even distribution of the force to be transmitted by the spring 3.

In accordance with the exemplary embodiment, the contact member 2 is free to rotate. However, the contact member 2 may be glued or fixed to the member 4 to prevent rotation. Preventing rotation prevents the gummy, removable adhesive from the edges of the replica tape from migrating into the interior of the burnishing tool, binding it up, and reducing the precision of the force being applied. Second, fixing the contact member 2 may give the user a slightly better feel for when they are at the edge of the hole in the replica tape, and shouldn't burnish any further. The rotating member may roll right over the edge of the hole in the replica tape and away from the area that needed burnishing, without giving the operator much feedback.

In accordance with an exemplary embodiment, the exterior portion 11 comprises a flat portion 13 having an opening 14 therein, such that the contact member 2 protrudes from the interior hollow portion 12 through the opening 14. In FIG. 3, the flat portion 13 is the portion of the exterior portion 11 which is to be in contact with the flat surface, e.g., the replica tape, when the apparatus 100 is used to apply consistent pressure on the flat surface. In FIG. 3, contact member 2 is a sphere partially contained within the interior hollow portion 12. The contact member 2 is not limited to a sphere and may be a hemisphere or any other shape wherein the part of the contact member contacting the surface has a rounded shape. The opening 14 may have a circular shape such that the contact member, wherein the part of the contact member contacting the surface has a spherical shape, may be configured to protrude from the circular opening 14. In a preferred embodiment, the diameter of the opening 14 is about the same as, but slightly less than, the diameter of the contact member 2, such that the contact member 2 is prevented from falling out. The diameter of the opening 14 may be between about 0.125-about 1 in., between 0.2-0.9 in., between 0.3-0.8 in., between 0.3-0.7 in., between 0.3-0.6 in., between 0.3-0.5 in., between 0.3-0.4 in., or about 0.3 in.

In the example of FIG. 3, the flat portion 13 is circular in shape and borders the opening 14 and the portion of the contact member 2 which protrudes from the opening 14. The outer diameter of the flat portion 13 may be between about 0.2 to about 2 in., between about 0.3-1.9 in., between 0.4-1.8 in., between 0.5-1.7 in., between 0.6-1.6 in., between 0.7-1.5 in., between 0.7-1.4 in., between 0.7-1.3 in., between 0.7-1.2 in., between 0.7-1.1 in., between 0.7-1.0 in., between 0.7-0.9 in., or between 0.7-0.8 in. The outer surface of the flat portion 13 which contacts the flat surface may have a slightly rounded edge.

In accordance with an exemplary embodiment, the opening 14 comprises a first area. The flat portion 13, minus the first area, comprises a second area. A ratio of the second area over the first area helps to define the relative distribution of the contact between the flat area and the contact member 2.

The ratio of the second area over the first area is preferably at least one, at least two, at least three, at least four, or at least five.

However, the actual contact of the contact member 2 with the replica tape is difficult to calculate because of the roundness of the contact member and the compressibility of the replica tape. For success, the flat portion 13 should have a greater contact area than the area of the contact member 2 which contacts the flat surface, which, being a spherical surface, is quite small.

Accordingly, a more important ratio is the ratio of the second area over the area of contact portion of the contact member 2, which should be at least 1.0 or greater, such as 1.5, 2.0, 2.5, 3.0. 3.5 or greater. It is important that there is adequate surface area of the flat portion 13 to contact the flat surface which the apparatus 100 is applying a consistent pressure onto. The flat portion 13 may be composed of a material which makes it easy to contact and move over the flat surface which the apparatus 100 is applying a consistent pressure onto.

In accordance with an exemplary embodiment, a lip 15 is formed at the portion of the flat portion 13 adjacent the interior hollow portion 12 so as to retain the spherical contact member 2 within the interior hollow portion 12. In FIG. 3, the lip 15 extends slightly farther into the interior hollow portion 12 than the adjacent sections of the exterior portion 11.

Figure 4:
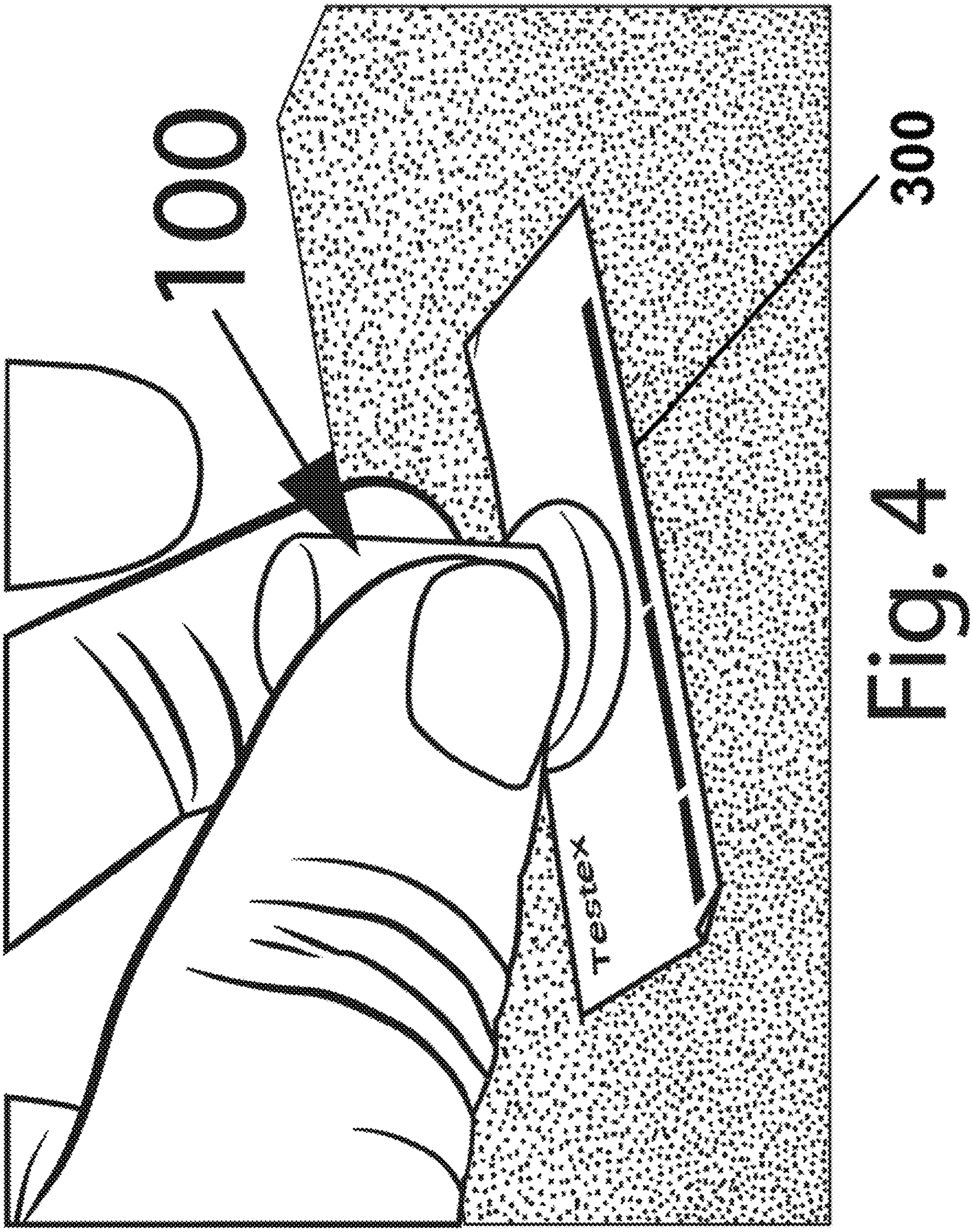
FIG. 4 shows an example of a method of burnishing a replica tape with consistent pressure according to an exemplary embodiment of the present disclosure.

FIG. 4 shows an example of a method of burnishing a replica tape 300 with a consistent pressure according to an exemplary embodiment of the present disclosure. In accordance with an exemplary embodiment, the method of burnishing a replica tape with a consistent pressure with an apparatus 100 having a flat surface 13 with an opening 14 in it and a spring-loaded contact member 2 protruding from the opening 14, comprises applying the flat portion 13 of the apparatus 100 on the replica tape 300 and moving the apparatus 100 over the replica tape 300 so that the spring-loaded contact member 2 applies a substantially consistent pressure on the replica tape 300. In the example of FIG. 4, a user is holding the exterior portion 11 of the apparatus 100 and applying sufficient force such that the flat portion 13 is applied on the replica tape 300. It is understood that the spring-loaded contact member 2 which protrudes from the opening 14 is applying a substantially consistent pressure on the replica tape 300.

Figure 5:
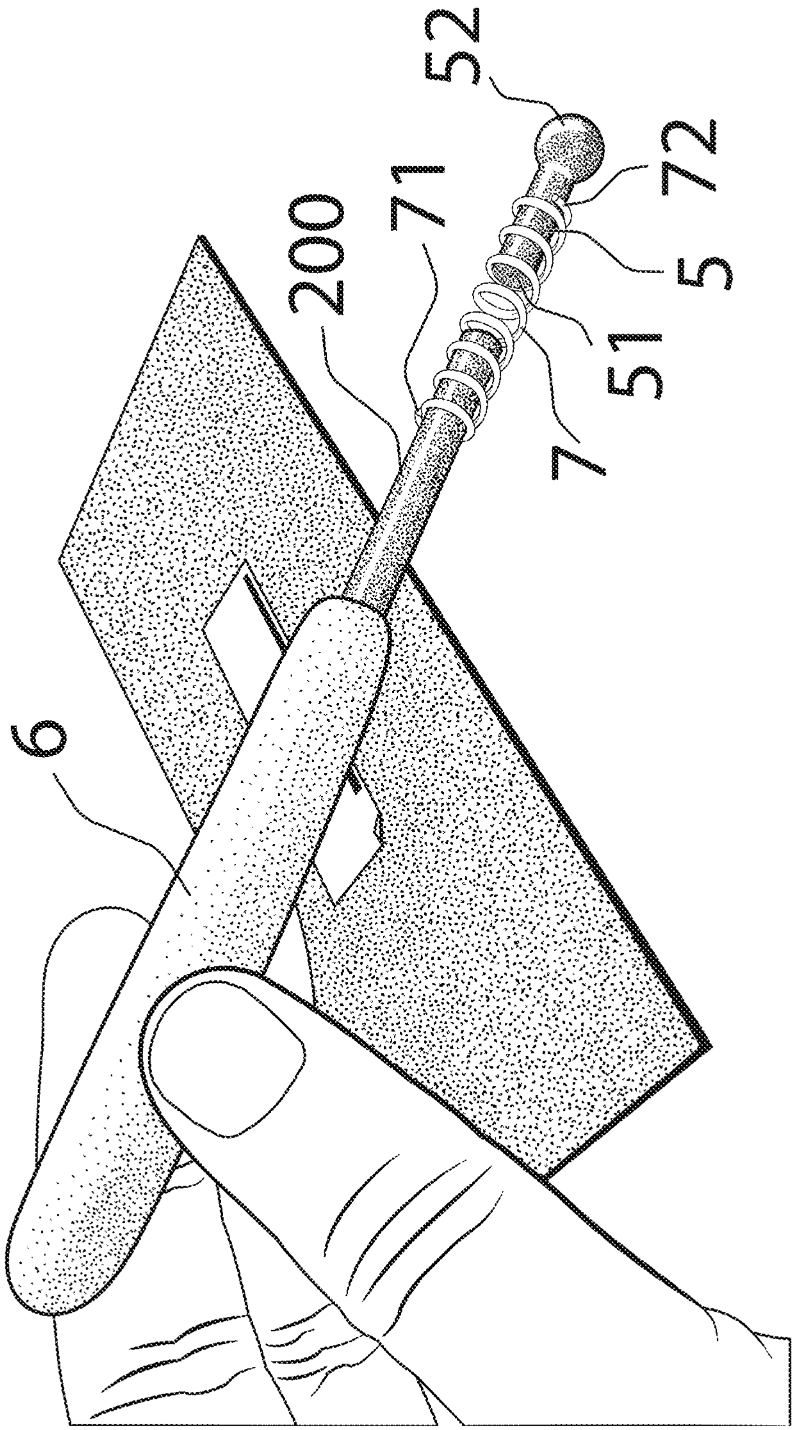
FIG. 5 is a perspective view of an apparatus for applying consistent pressure on a flat surface according to a second exemplary embodiment of the present disclosure.

FIG. 5 is a perspective view of an apparatus 200 for applying consistent pressure on a flat surface according to a second exemplary embodiment of the present disclosure. In accordance with a second exemplary embodiment, the apparatus 200 comprises a first elongated portion 5 having a first end 51 and a second, rounded end 52, a holder 6, and a flexible cylinder 7, wherein a first end of the flexible cylinder 71 is attached to the holder 6, and the first end of the first elongated portion 51 is connected to a second end of the flexible cylinder 72. In the example of FIG. 5, the flexible cylinder is a coiled spring. The flexible cylinder 7 is not limited to a coiled spring and may be any elongated member that is flexible and can be used as a force-limiting means.

Figure 6:
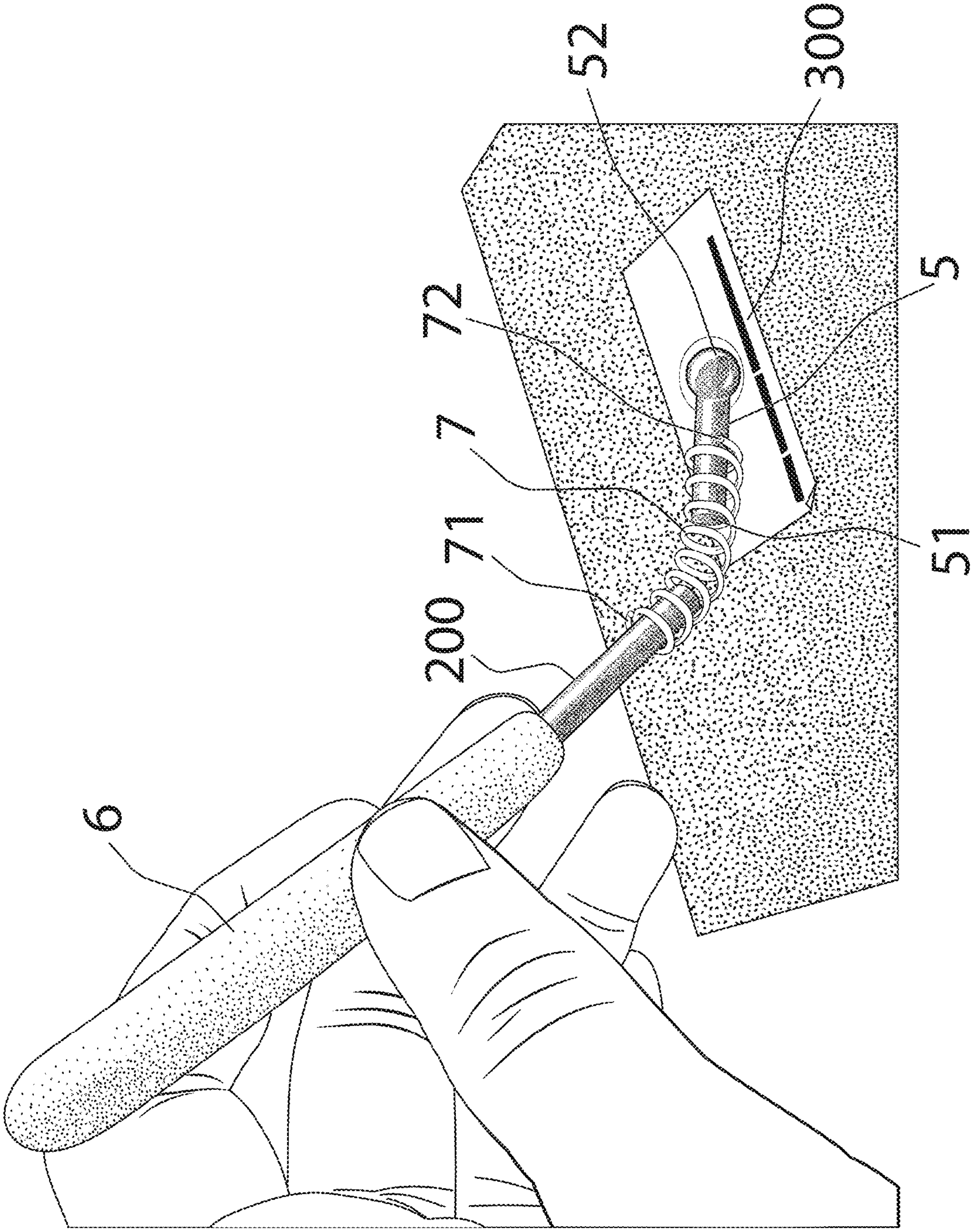
FIG. 6 shows an example of a method of burnishing a replica tape with consistent pressure according to the second exemplary embodiment of the present disclosure.

FIG. 6 shows an example of a method of burnishing a replica tape with a consistent pressure according to a second exemplary embodiment of the present disclosure. In accordance with a second exemplary embodiment, the method comprises applying the rounded end 52 of the apparatus 200 on the replica tape 300 and applying pressure on the replica tape 300 with the rounded end 52 while holding the holder 6. In the example of FIG. 6, the rounded end 52 of the apparatus 200 is applied on the replica tape and a user is holding the holder 6 and applying force to the apparatus 200 such that a portion of the flexible cylinder 7 is in contact with the replica tape 300.

Figure 7:
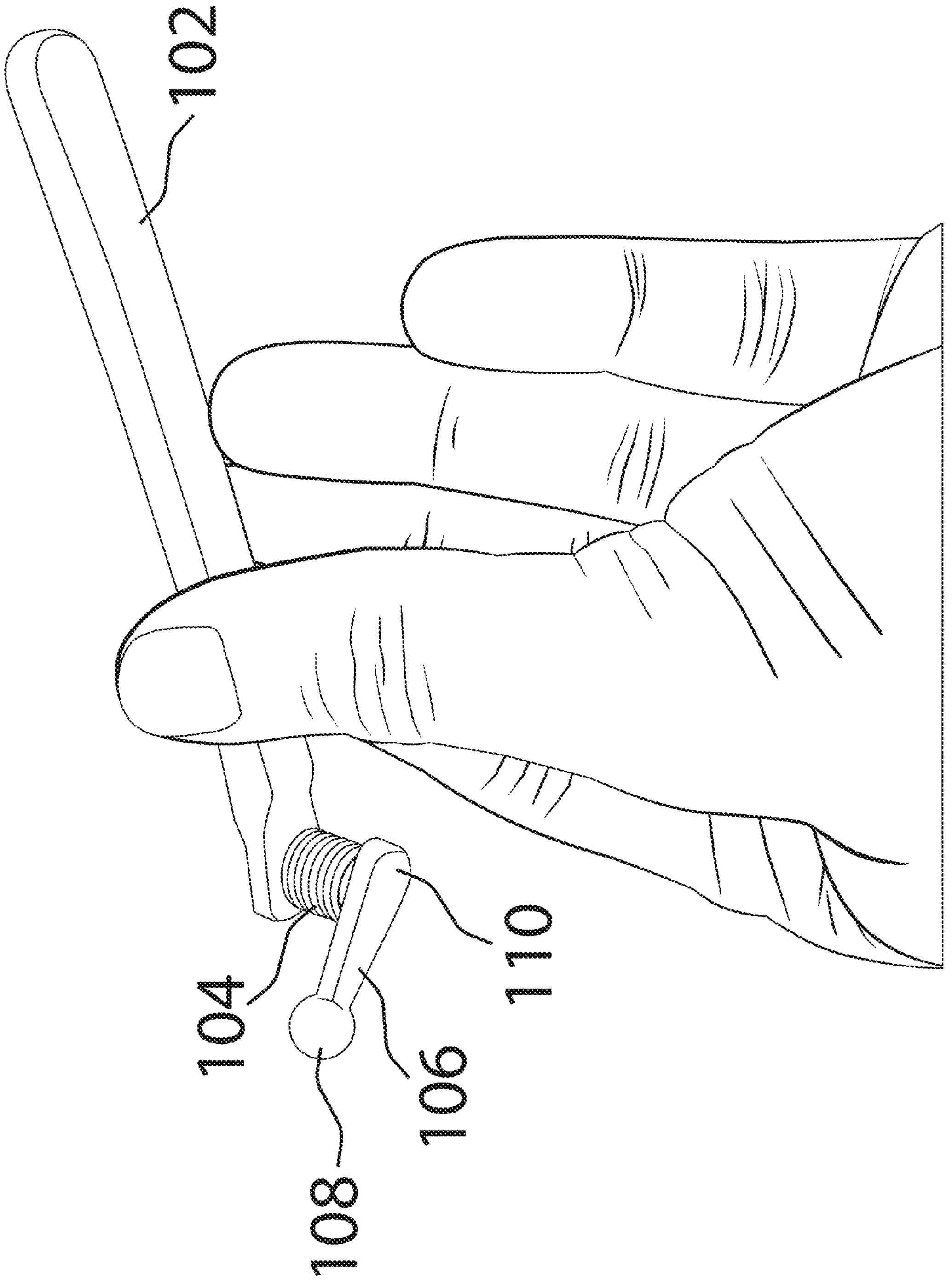
FIG. 7 shows an example of a third exemplary embodiment of the present disclosure.

FIG. 7 discloses another embodiment of the invention. This embodiment includes a long arm 102 having a torsion spring 104 mounted at one end thereof. A short arm 106 has a first end 108 that is rounded and capable of burnishing a replica tape. A second end 110 of the short arm includes a protrusion that is configured to engage with the torsion spring such that that the short arm can pivot with respect to the long arm.

The first rounded end 108 has a rounded portion having a diameter in the range of about 0.2 to 1.0 inches, or 0.3 to 0.9 inches, or 0.4 to 0.8 inches, or 0.5 to 0.7 inches.

Other embodiments of the present invention may include a structure such that the holder of the contact member is sufficiently spaced from the contact member such that the holder does not contact the replica tape during burnishing. If the flat portion is sufficiently distant from the contact member such that it always contacts the flat surface at a location away from the replica tape, the area ratio does not matter. Consider an embodiment where the opening comprising a first area is several inches in diameter, with the contact member suspended inside, such that the replica tape always remains inside that first area (and therefore never contacts the second/flat area) during burnishing. The flat portion/second area could be as small as a point, since it would be sitting on the blasted metal, and the force applied by that second surface wouldn't affect the measurement. One could imagine some sort of 'tripod'-style device, where the contact member is suspended in the middle, such that the contact member is the only part of the apparatus making any contact with the replica tape. The 'feet' of the tripod would rest away from the replica tape on the blasted surface (if the contact member was configured to allow some lateral movement versus the 'tripod'), or those feet could be configured to slide on the blasted surface, such that the contact member moves laterally in concert with the entire tripod.

Figure 8B:
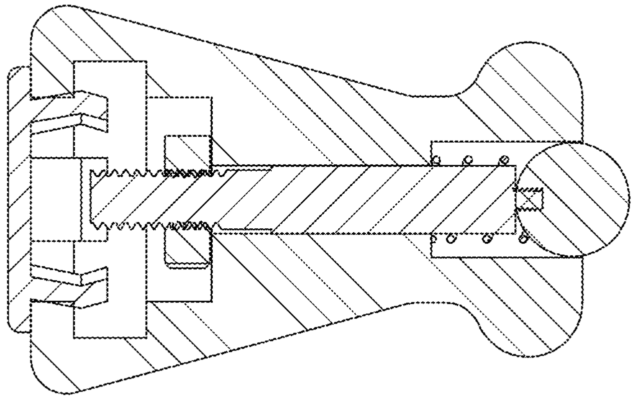
FIGS. 8A and 8B show an example of a fourth exemplary embodiment of the present disclosure.
Figure 8A:
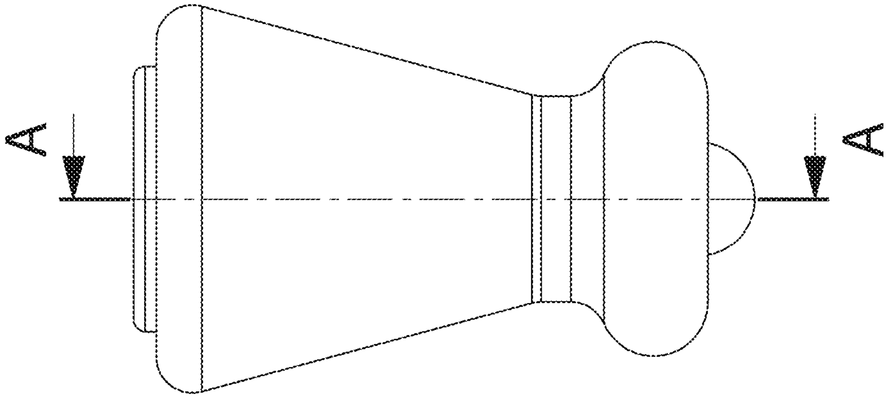

Yet another embodiment of the invention is illustrated in FIG. 8.

One of ordinary skill in the art would be able to determine an appropriate stiffness of the torsion spring appropriate for burnishing a replica tape. For example, the arms and torsion spring of this embodiment are configured to apply a force of between 200-1000 gf, 200-900 gf, 300-800 gf, 400-700 gf, 500-600 gf, or about 450 gf on the burnishing tape.

The disclosed preferred embodiments are representative of the invention, and the claims are not limited to the preferred disclosed embodiments.

What is claimed is:

1. A hand-held tool for applying a constant burnishing pressure on a flat surface, the tool comprising:
- a housing, the housing comprising an exterior portion and an interior hollow portion;
- a spherical contact member contained within the interior hollow portion;
- a spring arranged in the interior hollow portion and configured so as to apply a biasing force on the spherical contact member so that a portion of the spherical contact member protrudes from the interior hollow portion so as to apply a constant burnishing pressure on the flat surface when applied by hand;
- the exterior portion comprising a flat portion having an opening therein, such that the spherical contact member protrudes from the interior hollow portion through the opening;

the opening comprising a first area;

the flat portion comprising a second area;

wherein a ratio of the second area over the first area is at least two.

2. The tool according to claim 1, wherein the contact member has a spherical tip with a diameter of between 0.2 to 0.9 inches.

3. The tool according to claim 2, wherein a lip is formed at the portion of the flat portion adjacent the interior hollow portion so as to retain the spherical contact member within the interior hollow portion.

4. The tool according to claim 1, wherein a member is provided between the spring and the contact member to transmit force from the spring to the spherical contact member.

5. The tool according to claim 1, wherein the spring is configured to apply a constant force of about 450 grams on the contact member.

6. The tool according to claim 1, wherein the ratio of the second area over the first area is at least four.

7. The tool according to claim 1, wherein the contact member is fixed to the housing to prevent rotation.

8. A method of burnishing a replica tape with consistent pressure with a hand-held tool having a flat surface with an opening in the flat surface, and a spring-loaded contact member protrudes from the opening, wherein the method comprises:

contacting the replica tape with the flat surface of the tool such that the spring-loaded contact member contacts the replica tape with a predetermined pressure while the flat surface of the tool is in contact with the replica tape; and moving the tool over the replica tape so that the spring-loaded contact member applies a substantially consistent pressure on the replica tape when applied by hand.

9. A hand-held tool for applying consistent pressure on a flat surface, the tool comprising:

a holder having a flat portion and the flat portion includes an opening therein;

a contact member having a spherical portion, the contact member arranged within the holder such that the spherical portion protrudes from the opening in the flat portion, the spherical portion being configured to engage a replica tape on the flat surface when the flat portion is in planar contact with the replica tape or a surface substantially coplanar with the replica tape; and a spring operatively coupled between the holder and the contact member, wherein, the tool is configured such that when the tool is urged toward the flat surface, the spring applies a predetermined biasing force that urges the contact member against a replica tape on the flat surface, such that the replica tape on the flat surface is burnished with substantially uniform pressure across the replica tape when applied by hand.

10. The tool according to claim 9, wherein the spring is a compression spring arranged to apply the predetermined biasing force between the holder and the contact member.

11. The tool according to claim 9, wherein the tool is configured such that when the tool is urged toward the flat surface, the spring applies a predetermined biasing force such that the replica tape is burnished with substantially uniform pressure.

12. The tool according to claim 9, wherein only the spherical portion protrudes from the opening in the flat portion.

13. A method of burnishing a replica tape on a flat surface with consistent pressure with a hand-held tool having a spring supported contact member, the contact member having a rounded portion, wherein the method comprises:

contacting a portion of the replica tape that is on the flat surface simultaneously with both the spring supported contact member and another portion of the tool such that spring supported contact member contacts the replica tape with a predetermined pressure while the another portion of the tool is in contact with the replica tape on the flat surface; and moving the tool over the portion of the replica tape while the spring supported contact member and the another portion of the tool simultaneously contact the replica tape on the flat surface so that the spring supported contact member applies a substantially consistent pressure on the replica tape between the contact member and the flat surface.

14. The method according to claim 13, wherein the method includes contacting the replica tape and the flat surface simultaneously with both the spring supported contact member and another portion of the tool such that spring supported contact member contacts the replica tape with a predetermined pressure while the another portion of the tool is in contact with the flat surface; and moving the tool over the replica tape while the spring supported contact member and the another portion of the tool simultaneously contact the replica tape and the flat surface, respectively, so that the spring supported contact member applies a substantially consistent pressure on the replica tape.

15. The method according to claim 13, wherein the rounded portion of the contact member is a portion of a sphere.

16. A hand-held tool for applying consistent pressure on a replica tape on a flat surface, the tool comprising:

a holder including a spring;

a contact member having a rounded portion, the contact member supported by the holder with the spring, the rounded portion and the holder being configured to simultaneously engage the replica tape on the flat surface; and wherein the spring biases the contact member to enable spring biased relative movement between the rounded portion and the holder, wherein, the tool is configured such that when the tool is urged toward the replica tape so that the rounded portion and the holder simultaneously contact the replica tape on the flat surface, the spring applies a predetermined biasing force that urges the rounded portion against the replica tape such that the replica tape is burnished with substantially uniform pressure across the replica tape when applied by hand.

17. The tool according to claim 16, wherein the tool is configured to enable the rounded portion to engage the replica tape on the flat surface while the holder simultaneously engages the flat surface.

18. The method according to claim 16, wherein the rounded portion of the contact member is a portion of a sphere.

* * * * *